United States Patent
Zhan

(10) Patent No.: US 10,346,666 B2
(45) Date of Patent: Jul. 9, 2019

(54) FINGERPRINT DETECTING CIRCUIT AND FINGERPRINT IDENTIFICATION SYSTEM

(71) Applicant: Shenzhen Goodix Technology Co., Ltd., Shenzhen, Guangdong (CN)

(72) Inventor: Chang Zhan, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 169 days.

(21) Appl. No.: 15/659,564

(22) Filed: Jul. 25, 2017

(65) Prior Publication Data

US 2017/0323136 A1    Nov. 9, 2017

Related U.S. Application Data

(63) Continuation of application No. PCT/CN2015/094638, filed on Nov. 16, 2015.

(30) Foreign Application Priority Data

Jul. 27, 2015   (CN) .......................... 2015 1 0448095

(51) Int. Cl.
   *G06K 9/28*    (2006.01)
   *G06K 9/00*    (2006.01)
   (Continued)

(52) U.S. Cl.
   CPC ........... *G06K 9/0002* (2013.01); *G06F 3/044* (2013.01); *G06K 9/00067* (2013.01); *G06K 9/00087* (2013.01); *G06K 9/64* (2013.01)

(58) Field of Classification Search
   CPC .................................................. G06K 9/0002
   See application file for complete search history.

(56) References Cited

U.S. PATENT DOCUMENTS 6,362,633 B1 *  3/2002  Tartagni ................... G01B 7/34
                                                              324/661
6,975,356 B1   12/2005  Miyamoto
                        (Continued)

FOREIGN PATENT DOCUMENTS

CN          1564189 A      1/2005
CN        101755219 A      6/2010
                (Continued)

OTHER PUBLICATIONS

Anonymous, AN-88 CMOS Linear Applications, XP055452445, Apr. 2003, Fairchild Semiconductor.
(Continued)

*Primary Examiner* — Brian Werner
(74) *Attorney, Agent, or Firm* — Winston Hsu

(57) ABSTRACT

The present invention, belonging to a field of fingerprint detecting technology, relates to a fingerprint detecting circuit including: a first conductive layer; a second conductive layer; an inverting amplifier, comprising a single input terminal coupled to the first conductive layer; and an output terminal coupled to the second conductive layer; and a switch, configured for establishing a DC operating point of the inverting amplifier, wherein a terminal of the switch is coupled to the input terminal, and another terminal of the switch is coupled to the output terminal. The present invention utilizes the inverting amplifier with single input single output and the switch to quickly and correctly establish the DC biasing point of the inverting amplifier, and convert the sensing capacitance into the output signal. No need for another biasing circuit. The circuit structure thereof is simple and the accuracy is high.

15 Claims, 4 Drawing Sheets

(51) Int. Cl.
  *G06F 3/044* (2006.01)
  *G06K 9/64* (2006.01)

(56) References Cited

U.S. PATENT DOCUMENTS

| | | | |
|---|---|---|---|
| 7,755,369 | B2 | 7/2010 | Chuang |
| 8,547,170 | B1 | 10/2013 | Stobie |
| 2001/0043728 | A1 | 11/2001 | Kramer |
| 2008/0069413 | A1 | 3/2008 | Riedijk |
| 2009/0123039 | A1 | 5/2009 | Gozzini |
| 2011/0127991 | A1 | 6/2011 | Senda |
| 2016/0210495 | A1* | 7/2016 | Jagemalm ............... H01L 24/49 |

FOREIGN PATENT DOCUMENTS

| | | |
|---|---|---|
| CN | 103093508 A | 5/2013 |
| CN | 103886281 A | 6/2014 |
| CN | 103902971 A | 7/2014 |
| CN | 104331202 A | 2/2015 |
| CN | 104573649 A | 4/2015 |
| CN | 105117684 A | 12/2015 |
| CN | 105138957 A | 12/2015 |
| JP | H11-253428 A | 9/1999 |
| JP | 2008-502989 A | 1/2008 |
| JP | 2011-113384 A | 6/2011 |
| WO | 2005/124659 A1 | 12/2005 |
| WO | 2006/099981 A1 | 9/2006 |
| WO | 2015/026288 A1 | 2/2015 |

OTHER PUBLICATIONS

Borivoje Nikolic, The CMOS Inverter, Sep. 6, 1999, XP055452300, pp. 144-192.

\* cited by examiner

FINGERPRINT DETECTING CIRCUIT AND FINGERPRINT IDENTIFICATION SYSTEM

CROSS REFERENCE TO RELATED APPLICATIONS

The present application is a continuation of international application No. PCT/CN2015/094638, filed on Nov. 16, 2015, which claims the priority to Chinese Patent Application No. 201510448095.8, filed with the Chinese Patent Office on Jul. 27, 2015, both of which are incorporated herein by reference in its entirety.

BACKGROUND OF THE INVENTION

1. Field of the Invention

The present invention, belonging to a field of fingerprint detecting technology, relates to a fingerprint detecting circuit and a fingerprint identification system, and more particularly, to a fingerprint detecting circuit and a fingerprint identification system with high accuracy and simple circuit structure.

2. Description of the Prior Art

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, the personal fingerprint identification is utilized to achieve the purpose of personal identification, for enhancing the data security.

Capacitive fingerprint identification system is a popular fingerprint identification method, which is to sense a capacitance variation to determine a finger ridge or a finger valley of a user's finger. Specifically, the capacitive fingerprint identification system utilizes a metal electrode to receive a touch from a user, and the fingerprint detecting circuit therein may transform a capacitance between the metal electrode and the finger into a voltage signal and output the voltage signal to a backend fingerprint determining module, such that fingerprint identification is performed. However, the fingerprint detecting circuits within the capacitive fingerprint identification system usually requires complicated biasing circuits, to make sure that the fingerprint detecting circuits operate correctly (i.e., the direct current (DC) biasing point of the fingerprint detecting circuit lies in an appropriated region). A biasing circuit that is excessively simple would affect an accuracy of the fingerprint detecting circuit. Therefore, how to provide a fingerprint detecting circuit with simple circuit structure and high accuracy is a significant objective in the field.

SUMMARY OF THE INVENTION

It is therefore a primary objective of the present invention to provide a fingerprint detecting circuit and a fingerprint identification system, to enhance an accuracy thereof with simple circuit structure.

The present invention is implemented as follows: fingerprint detecting circuit comprises:
a first conductive layer;
a second conductive layer;
an inverting amplifier, comprising a single input terminal coupled to the first conductive layer; and an output terminal coupled to the second conductive layer; and
a switch, configured for establishing a direct current (DC) operating point of the inverting amplifier, wherein a terminal of the switch is coupled to the input terminal of the inverting amplifier, and another terminal of the switch is coupled to the output terminal of the inverting amplifier.

The object of the present invention is also to provide a fingerprint identification system. The fingerprint identification system comprises:
a plurality of fingerprint detecting circuits, each fingerprint detecting circuit comprising:
a first conductive layer;
a second conductive layer;
an inverting amplifier, comprising a single one input terminal coupled to the first conductive layer; and an output terminal coupled to the second conductive layer; and
a switch, configured for establishing a direct current (DC) operating point of the inverting amplifier, wherein a terminal of the switch is coupled to the input terminal of the inverting amplifier, and another terminal of the switch is coupled to the output terminal of the inverting amplifier; a fingerprint determining module, coupled to the plurality of fingerprint detecting circuit, configured to determine whether each fingerprint detecting circuit corresponds to a finger ridge or a finger valley.

The embodiments in the present invention utilizes the inverting amplifier with single input single output and the switch to quickly and correctly establish the DC biasing point of the inverting amplifier, and convert the sensing capacitance into the output signal. No need for another biasing circuit. The circuit structure thereof is simple and the accuracy is high.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
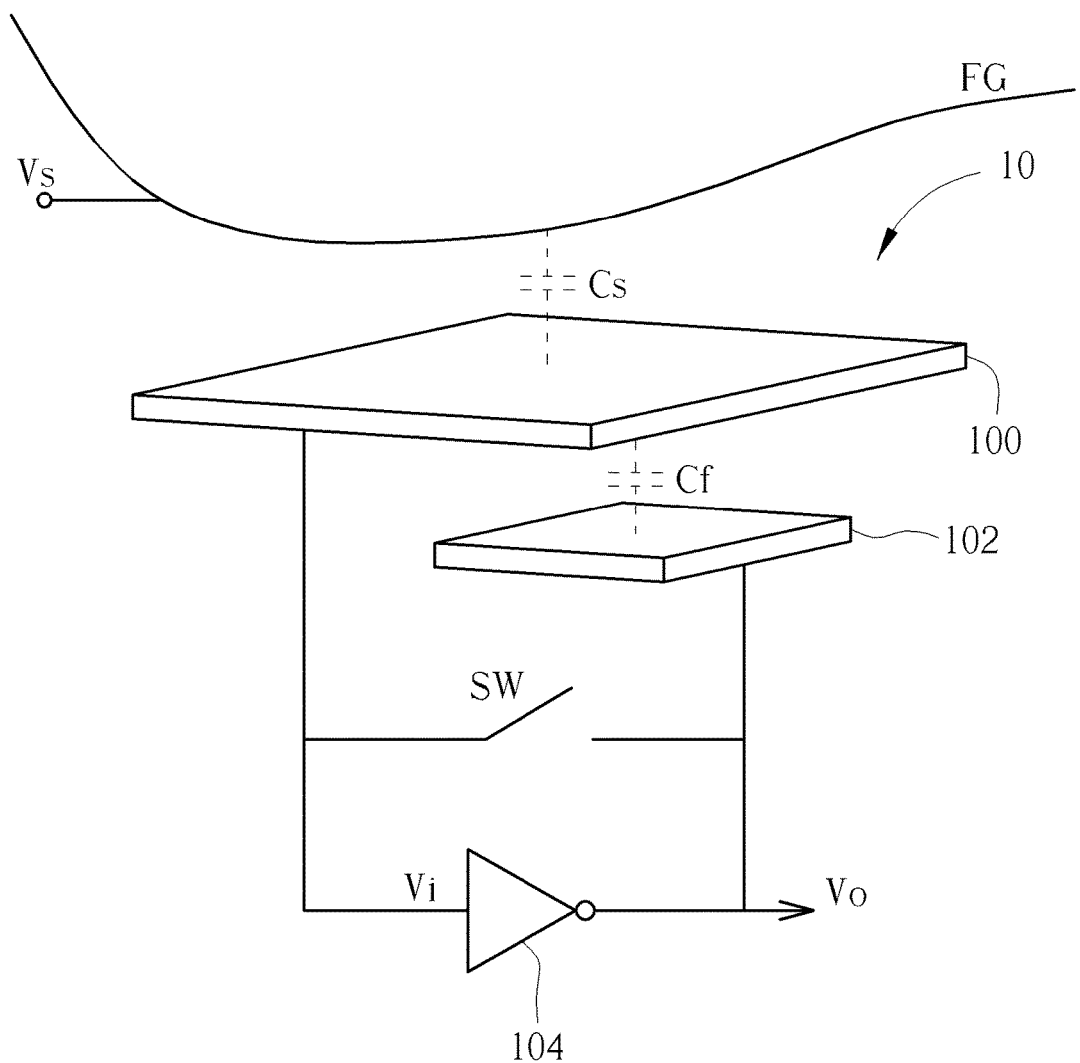
FIG. 1 is a schematic diagram of a fingerprint detecting circuit provided by a first embodiment of the present invention.

As shown in FIG. 1, which is a schematic diagram of a fingerprint detecting circuit 10 provided by a first embodiment of the present invention. The fingerprint detecting circuit 10 comprises an inverting amplifier 104, a switch SW and conductive layers 100 and 102. The conductive layer 100 is a top conductive layer, which may be a metal electrode or a metal layer within an integrated circuit (IC) layout. The conductive layer 100 is configured to couple a touch from a finger FG. The conductive layer 102 is a non-top conductive layer, which may be a metal electrode, a metal layer or a poly layer within the IC layout. The conductive layer 102 is disposed under the conductive layer 100. A reference capacitance Cf is formed between the conductive layer 100 and the conductive layer 102, and a sensing capacitance Cs is formed between the conductive layer 100 and the finger FG. The inverting amplifier 104 is a single input single output amplifier, which comprises only one input terminal and an output terminal. The input terminal of the inverting amplifier 104 is coupled to the conductive layer 100, and the output terminal is coupled to the conductive layer 102. The switch SW is utilized for establishing a direct current (DC) operating point of the inverting amplifier 104. An terminal of the switch SW is coupled to the input terminal of the inverting amplifier 104, and another terminal of the switch SW is coupled to the output terminal of the inverting amplifier 104.

Specifically, the value of the reference capacitance Cf depends on an area of the conductive layer 102. When the area of the conductive layers 100 and 102 are fixed, the reference capacitance Cf has a fixed capacitance value. On the other hand, the value of the sensing capacitance Cs varies with respect to characteristic of the finger FG. In addition, the finger FG may receive a driving signal Vs through the metal electrode, and the driving signal Vs may be coupled to the input terminal of the inverting amplifier 104 through the sensing capacitance Cs. That is, after the driving signal Vs is passed through the sensing capacitance Cs, an input signal Vi is formed at the input terminal of the inverting amplifier 104, and the inverting amplifier 104 generates an output signal Vo after receiving the input signal Vi. Therefore, the fingerprint detecting circuit 10 may convert the value of the sensing capacitance Cs into the output signal Vo. The output signal Vo may be delivered to a backend fingerprint determining module, so as to determine whether a location of the fingerprint detecting circuit 10 corresponds to a finger ridge or a finger valley.

Figure 2:
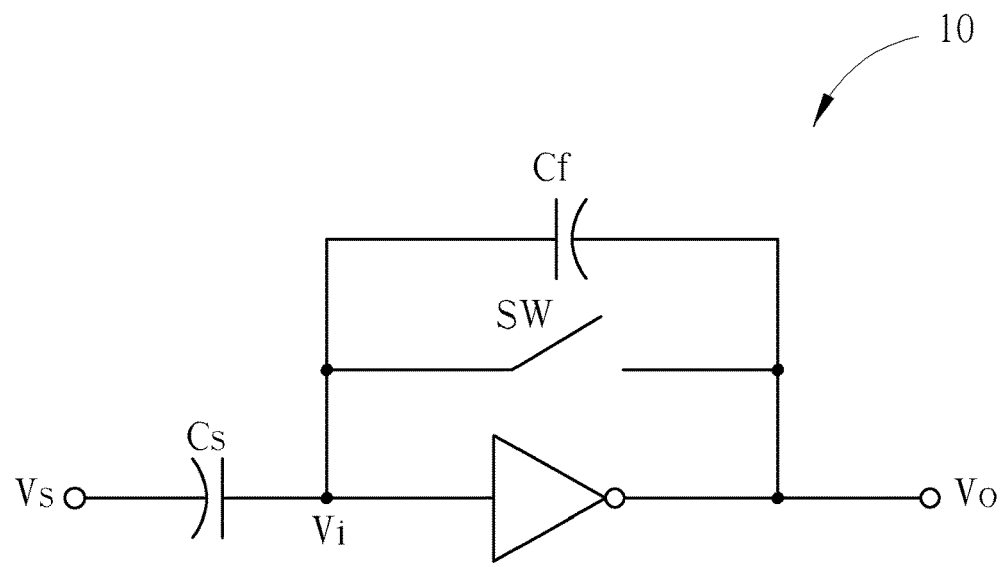
FIG. 2 is a schematic diagram of an equivalent circuit of the fingerprint detecting circuit in FIG. 1.

Specifically, please refer to FIG. 2, which is a schematic diagram of an equivalent circuit of the fingerprint detecting circuit 10. As can be seen from FIG. 2, a relationship between the driving signal Vs and the sensing capacitance Cs may be expressed as CsVs=−CfVo. Therefore, the fingerprint determining module may compute the value of the sensing capacitance Cs as Cs=−(Cf/Vs)*Vo, according to the output signal Vo, and determine whether the location of the fingerprint detecting circuit 10 corresponds to the finger ridge or the finger valley.

Figure 3:
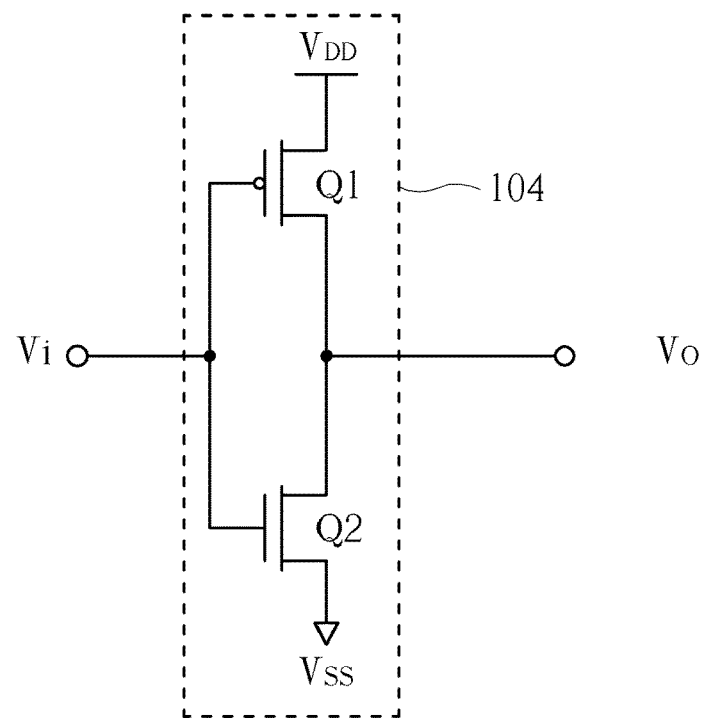
FIG. 3 is a schematic diagram of an inverting amplifier in FIG. 1.

In another perspective, the realization of the inverting amplifier 104 may be altered according to practical situation. For example, as FIG. 3 shows, FIG. 3 is a schematic diagram of the inverting amplifier 104. The inverting amplifier 104 comprises a first transistor Q1 and a second transistor Q2, where the first transistor Q1 is a PMOS FET (P-type Metal Oxide Semiconductor Field Effect Transistor), and the second transistor Q2 is an NMOS FET (N-type MOS FET). A gate of the first transistor Q1 is coupled to a gate of the second transistor Q2, forming the input terminal of the inverting amplifier 104 and configured to receive the input signal Vi. A drain of the first transistor Q1 is coupled to a drain of the second transistor Q2 forming the output terminal of the inverting amplifier 104 and configured to output an output signal Vo. A source of the first transistor Q1 is configured to receive a voltage VDD, and a source of the second transistor Q2 is configured to receive a voltage VSS.

As can be seen from FIG. 3, the circuit structure of the inverting amplifier 104 is the same as a CMOS (Complementary Metal Oxide Semiconductor) inverter. Different from the conventional CMOS inverter, the DC operating point of the inverting amplifier 104 is within the linear amplifying region, instead of the saturation region (note that the DC operating point of the conventional CMOS inverter is within the saturation region). In detail, in the fingerprint detecting circuit 10, the output terminal of the inverting amplifier 104 is coupled to the input terminal via the switch SW. When the switch SW is conducted, the output signal Vo is equal to the input signal Vi, so as to make sure that the inverting amplifier 104 operates in the linear amplifying region.

Figure 4:
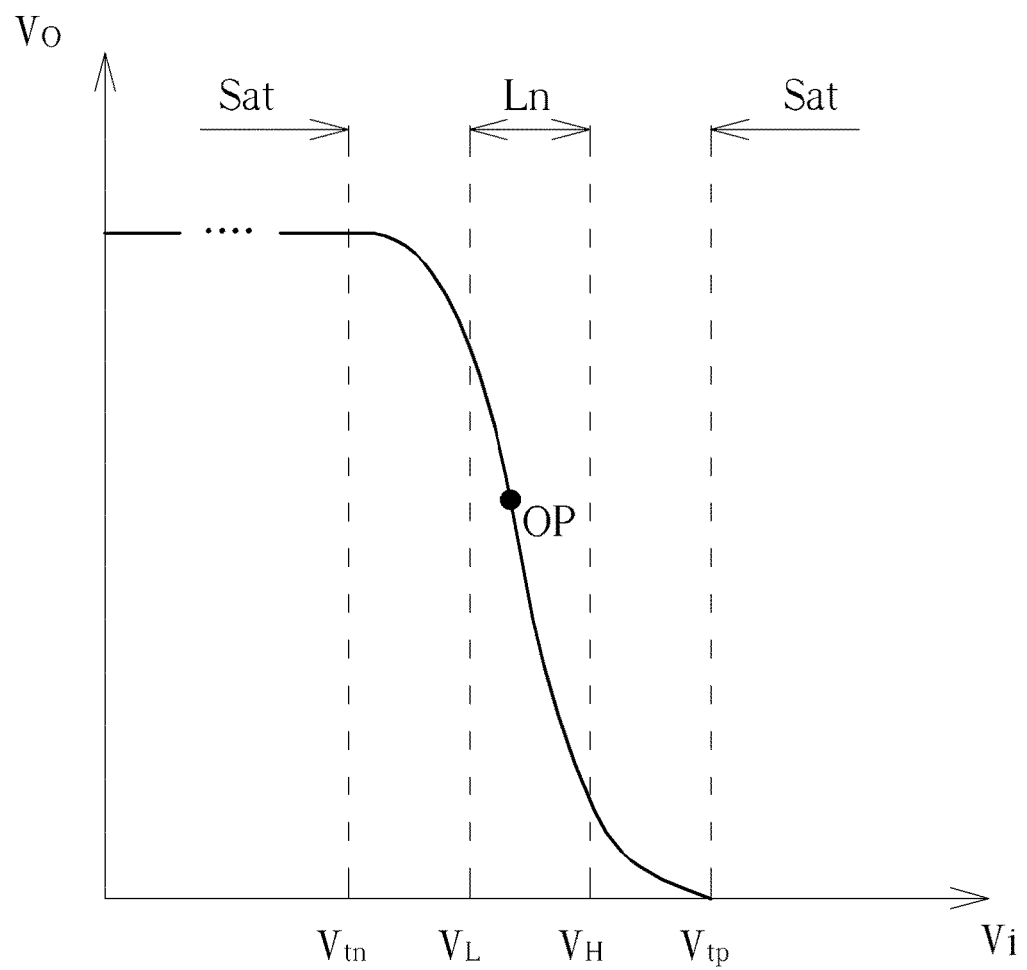
FIG. 4 is a schematic diagram of a voltage conversion characteristic of the inverting amplifier in FIG. 3.

Specifically, as shown in FIG. 4, FIG. 4 is a schematic diagram of a voltage conversion characteristic of the inverting amplifier 104. When the input signal Vi is greater than a voltage Vtp or smaller than a voltage Vtn, the inverting amplifier 104 operates within a saturation region Sat. When the input signal Vi is greater than a voltage VL and smaller than a voltage VH, the inverting amplifier 104 operates within a linear amplifying region Ln. In detail, when the switch SW is controlled to be conducted, the input signal Vi of the inverting amplifier 104 is equal to the output signal Vo. At this time, the inverting amplifier 104 is at a DC operating point OP, which means that the inverting amplifier 104 operates within the linear amplifying region Ln. Furthermore, the inverting amplifier 104 has a negative gain, which means that the output signal Vo increases (decreases) as the input signal Vi decreases (increases).

As can be seen, the fingerprint detecting circuit 10 only utilize the inverting amplifier 104 with simple circuit structure along with the switch SW, which convert the value of the sensing capacitance Cs as the output signal Vo precisely. Compared to the prior art, the fingerprint detecting circuit 10 does not require an extra biasing circuit, which has simple circuit structure and high accuracy.

Notably, the embodiments stated in the above are utilized for illustrating the concept of the present invention. Those skilled in the art may make modifications and alterations accordingly, and not limited herein. For example, in the inverting amplifier 104, the first transistor Q1 and the second transistor Q2 are not limited to be MOS FET. The first transistor Q1 and the second transistor Q2 may also be HEMT (High Electron Mobility Transistor), which is also within the scope of the present invention. In addition, the inverting amplifier is not limited to comprise the circuit structure which is illustrated in FIG. 3. As long as an inverter, which is originally applied in the digital circuit (i.e., the inverting circuit with a single input, a single output and a negative gain), and the switch, coupled between the input terminal and the output terminal of the inverter to limit the inverter to operate in the linear amplifying region, are included, it is within the scope of the present invention.

Figure 5:
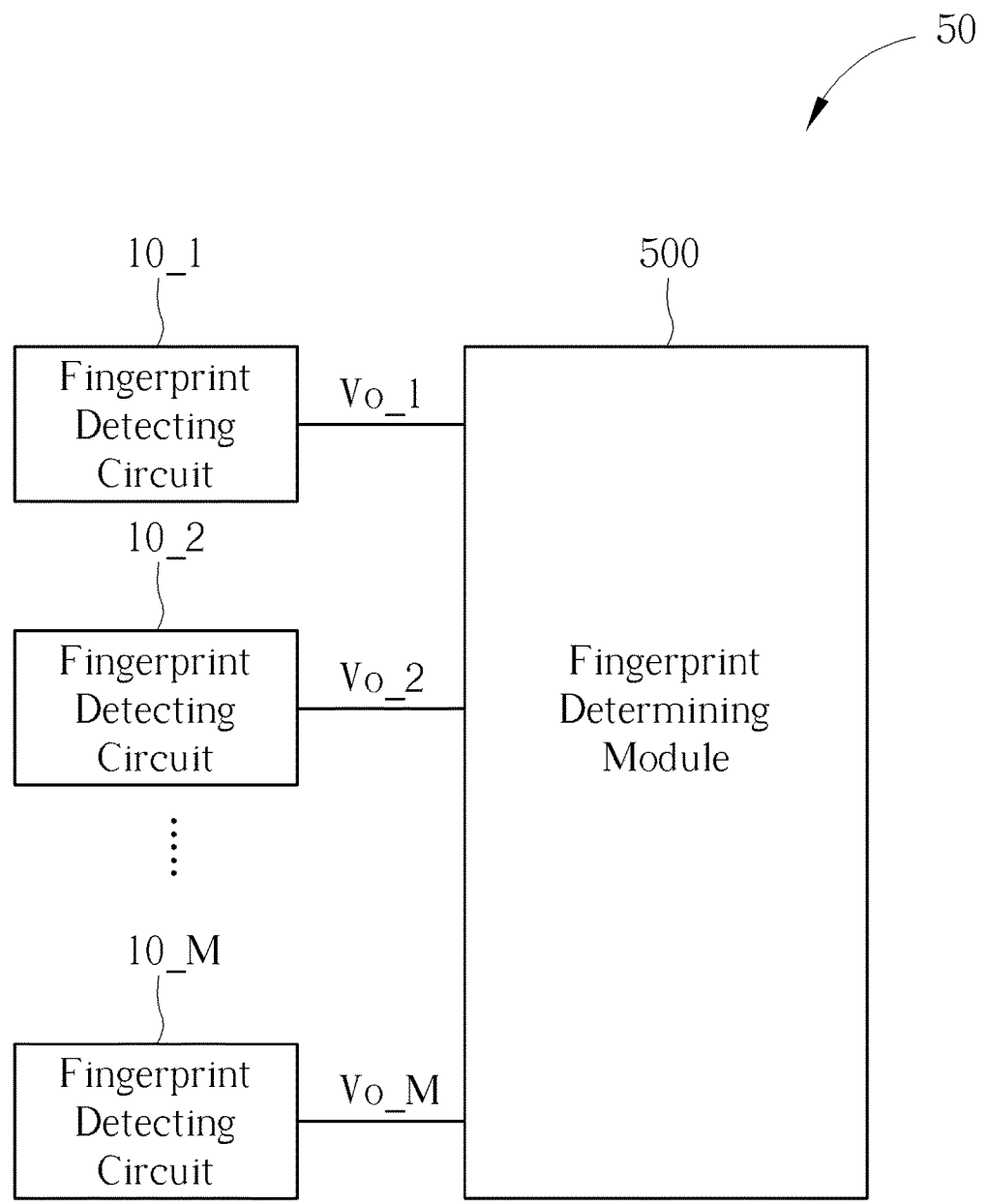
FIG. 5 is a schematic diagram of a fingerprint identification system provided by a second embodiment of the present invention.

In addition, the fingerprint detecting circuit 10 may be applied to a fingerprint identification system. As shown in FIG. 5, which is a schematic diagram of a fingerprint identification system 50 provided by a second embodiment of the present invention. The fingerprint identification system 50 comprises a fingerprint determining module 500 and fingerprint detecting circuits 10_1 to 10_M. The circuit structure of the fingerprint detecting circuits 10_1-10_M are the same as which of the fingerprint detecting circuit 10, which not narrated herein.

The fingerprint detecting circuits 10_1 to 10_M are coupled to the fingerprint determining module 500, and deliver output signals Vo_1 to Vo_M thereof to the fingerprint determining module 500. The fingerprint determining module 500 may determine whether locations of the fingerprint detecting circuits 10_1 to 10_M correspond to finger ridges or finger valleys. The fingerprint determining module 500, as known as a routine in the art, can be realized by a computer or a computing device, e.g., an ASIC (Application-specific integrated circuit). Notably, the area of the conductive layers 100 and 102 within the fingerprint detecting circuits 10_1 to 10_M are fixed, and the values of the reference capacitance Cf has fixed capacitance values. Therefore, relative voltage values of the output signals Vo_1 to Vo_M may be utilized to determine relative capacitance values of the sensing capacitance Cs corresponding to the fingerprint detecting circuits 10_1 to 10_M, and to determine the locations of the fingerprint detecting circuits 10_1 to 10_M correspond to finger ridges or finger valleys.

In summary, the fingerprint detecting circuit of the embodiments in the present invention utilizes the inverting amplifier with single input single output and the switch to quickly and correctly establish the DC biasing point of the inverting amplifier, and convert the sensing capacitance into the output signal. Compared to the prior art, the embodiments of the present invention do not require the extra biasing circuit, which has simple circuit structure and high accuracy.

The foregoing is only preferred embodiments of the present invention, it is not intended to limit the present invention, any modifications within the spirit and principles of the present invention made, equivalent replacement and improvement, etc., should be included in this within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint detecting circuit, comprising:
   a first conductive layer;
   a second conductive layer;
   an inverting amplifier, comprising a single input terminal coupled to the first conductive layer; and an output terminal coupled to the second conductive layer, wherein the inverting amplifier comprises:
      a first transistor, comprising a first terminal, a second terminal and a third terminal; and
      a second transistor, comprising:
         a first terminal, coupled to the first terminal of the first transistor;
         a second terminal, coupled to the second terminal of the first transistor; and
         a third terminal;
      wherein the third terminal of the first transistor is configured to receive a first voltage, the third terminal of the second transistor is configured to receive a second voltage;
      wherein when the switch is conducted, the DC operating point of the inverting amplifier is in an amplifying region; and
   a switch, configured for establishing a direct current (DC) operating point of the inverting amplifier, wherein a terminal of the switch is coupled to the input terminal of the inverting amplifier, and another terminal of the switch is coupled to the output terminal of the inverting amplifier.

2. The fingerprint detecting circuit of claim 1, wherein the second conductive layer is disposed under the first conductive layer, a reference capacitance is formed between the second conductive layer and the first conductive layer, and the reference capacitance is related to an area of the second conductive layer.

3. The fingerprint detecting circuit of claim 1, wherein the inverting amplifier has a negative gain.

4. The fingerprint detecting circuit of claim 1, wherein one transistor of the first transistor and the second transistor is a P-type transistor, and the other transistor of the first transistor and the second transistor is a N-type transistor.

5. A fingerprint identification system, utilized for fingerprint identification, comprising:
   a plurality of fingerprint detecting circuits, each fingerprint detecting circuit comprising:
      a first conductive layer;
      a second conductive layer;
      an inverting amplifier, comprising: a single input terminal coupled to the first conductive layer; and an output terminal coupled to the second conductive layer, wherein the inverting amplifier comprises:
         a first transistor, comprising a first terminal, a second terminal and a third terminal; and
         a second transistor, comprising:
            a first terminal, coupled to the first terminal of the first transistor;
            a second terminal, coupled to the second terminal of the first transistor; and
            a third terminal;
         wherein the third terminal of the first transistor is configured to receive a first voltage, the third terminal of the second transistor is configured to receive a second voltage;
         wherein when the switch is conducted, the DC operating point of the inverting amplifier is in an amplifying region; and
      a switch, configured for establishing a direct current (DC) operating point of the inverting amplifier, wherein a terminal of the switch is coupled to the input terminal of the inverting amplifier, and another terminal of the switch is coupled to the output terminal of the inverting amplifier;
   a fingerprint determining module, coupled to the plurality of fingerprint detecting circuit, configured to determine whether each fingerprint detecting circuit corresponds to a finger ridge or a finger valley.

6. The fingerprint identification system of claim 5, wherein the second conductive layer is disposed under the first conductive layer, a reference capacitance is formed between the second conductive layer and the first conductive layer, and the reference capacitance is related to an area of the second conductive layer.

7. The fingerprint identification system of claim 5, wherein the inverting amplifier has a negative gain.

8. The fingerprint identification system of claim 5, wherein one transistor of the first transistor and the second transistor is a P-type transistor, and the other transistor of the first transistor and the second transistor is a N-type transistor.

9. A fingerprint detecting circuit, comprising:
- a first conductive layer for forming a sensing capacitance with a finger;
- a second conductive layer;
- an inverting amplifier, comprising an input terminal coupled to the first conductive layer; and an output terminal coupled to the second conductive layer, wherein the inverting amplifier comprises:
  - a first transistor, comprising a first terminal, a second terminal and a third terminal; and
  - a second transistor, comprising:
    - a first terminal, coupled to the first terminal of the first transistor;
    - a second terminal, coupled to the second terminal of the first transistor; and
    - a third terminal;
  - wherein the third terminal of the first transistor is configured to receive a first voltage, the third terminal of the second transistor is configured to receive a second voltage;
- wherein when the switch is conducted, the DC operating point of the inverting amplifier is in an amplifying region; and
- a switch, wherein a terminal of the switch is coupled to the input terminal of the inverting amplifier, and another terminal of the switch is coupled to the output terminal of the inverting amplifier.

10. The fingerprint detecting circuit of claim 9, wherein the inverting amplifier is an inverting amplifier with a single input and a single output, and the switch is configured for establishing a direct current (DC) operating point of the inverting amplifier.

11. The fingerprint detecting circuit of claim 10, wherein the second conductive layer is disposed under the first conductive layer, a reference capacitance is formed between the second conductive layer and the first conductive layer, and the reference capacitance is related to an area of the second conductive layer.

12. The fingerprint detecting circuit of claim 10, wherein the inverting amplifier has a negative gain.

13. The fingerprint detecting circuit of claim 10, wherein the DC operating point of the inverting amplifier is within a linear amplifying region when the switch unit is conducted.

14. The fingerprint detecting circuit of claim 13, wherein a gate of the first transistor is coupled to a gate of the second transistor to form the input terminal of the inverting amplifier, a drain of the first transistor is coupled to a drain of the second transistor to form the output terminal of the inverting amplifier, a source of the first transistor and a source of the second transistor are configured for receiving a first voltage and a second voltage respectively.

15. The fingerprint detecting circuit of claim 14, wherein one transistor of the first transistor and the second transistor is a P-type transistor, and the other transistor of the first transistor and the second transistor is a N-type transistor.

* * * * *